Jan. 3, 1950 M. G. CROSBY 2,493,446

RADIO RECEIVER NOISE MUTING CIRCUIT

Filed Jan. 23, 1946

INVENTOR.
Murray G. Crosby
BY H. S. Grover
ATTORNEY

Patented Jan. 3, 1950 2,493,446

UNITED STATES PATENT OFFICE 2,493,446

RADIO RECEIVER NOISE MUTING CIRCUIT

Murray G. Crosby, Upper Montclair, N. J., assignor to Radio Corporation of America, a corporation of Delaware Application January 23, 1946, Serial No. 642,939

4 Claims. (Cl. 250—20)

Figure 1:
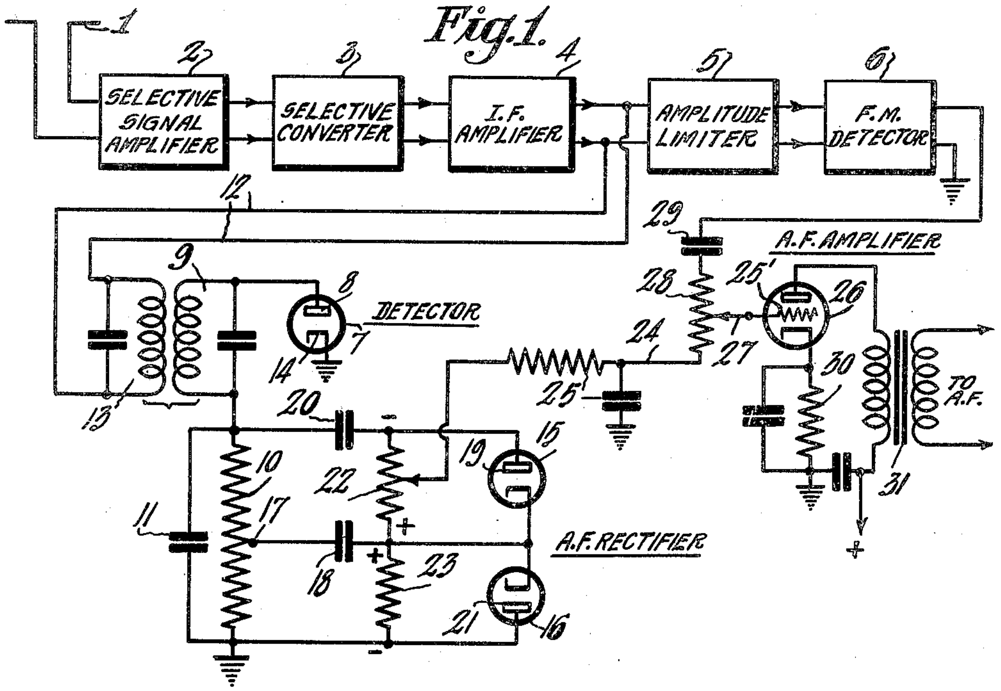

My present invention relates to noise control for angle modulated carrier wave receivers generally, and more specifically to automatic noise muting, or squelch, circuit for frequency modulation receivers.

One of the main objects of my present invention is to provide a novel, simple and highly effective means for providing control over a receiver of angle modulated carrier waves so as to eliminate the rush of noise which usually occurs when the received modulated carrier signal falls below a usable intensity level known as the "noise threshold level."

Another important object of my invention is to prevent inter-station noise during tuning of a frequency modulation receiver. The noise is prevented very simply, and without the addition of complicated circuits, by deriving a muting bias from the amplitude limiter input energy in response to the received carrier energy level decreasing towards the point where the peak received carrier voltage is substantially equal to the peak noise voltage.

Another object of my invention is to provide a novel muting, or squelch, control for a frequency modulation receiver. The present control method has the important advantage that the control voltage is derived from signal energy at the limiter input terminals, and is a function of the wave shape of the noise pattern of detected signal energy.

Other objects of my invention are to provide simplified muting arrangements for frequency modulation receivers, wherein a high level of control potential is provided which does not require amplification.

In my present muting method the circuits operate on the basis that below the noise threshold level the noise pattern (wave form of the detected amplitude modulated envelope of noise and signal) at the limiter input is not symmetrical, while the pattern is symmetrical in response to the input signal amplitude being above the threshold level. The non-symmetrical voltage is used for muting, or biasing, the audio amplifier to cut-off.

The generic expression "angle modulated carrier wave" is used herein to include both frequency modulated and phase modulated carrier wave energy. The abbreviation "FM" is used hereinafter to denote frequency modulation.

Still other objects of my invention are to improve generally the efficiency and reliability of FM receivers, and more especially to provide a noise-free FM receiver capable of being economically and simply manufactured and assembled.

Still other features and objects will best be understood by reference to the following description, taken in connection with the drawing, in which I have indicated diagrammatically a circuit whereby my invention may be carried into effect.

Figure 2A:
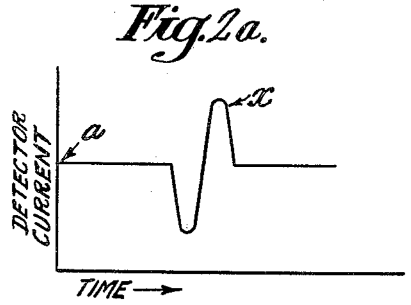
Figure 2B:
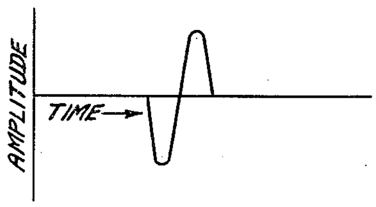
Figure 2C:
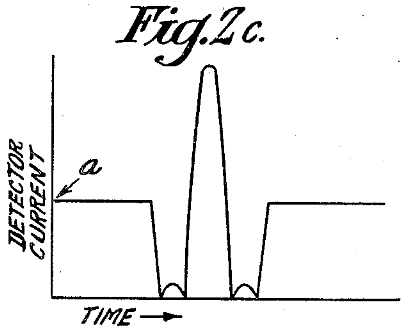
Figure 2D:
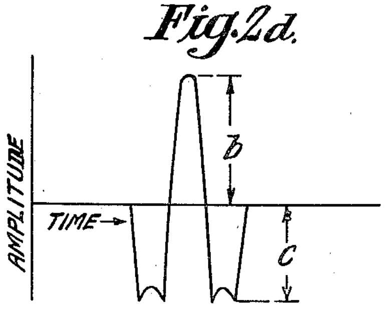

In the drawing:

Fig. 1 schematically shows an FM receiver system embodying the invention;

Figs. 2*a* and 2*b* are explanatory of the operation for the condition where noise is less than desired signal; and Figs. 2*c* and 2*d* are explanatory for the case of noise exceeding signal.

Referring now to the accompanying drawing, wherein like reference characters in the different figures designate similar circuit elements, the FM receiving system shown in Fig. 1 has its conventional networks schematically represented. Those skilled in the art of radio communication are fully aware of the manner of constructing and operating an FM receiver adapted to operate on the superheterodyne principle. My invention is not restricted to use in a radio receiver, nor to any specific range of frequencies. By way of specific example let it be assumed that the receiver is adapted to be operated in the former FM band of 42 to 50 megacycles (mc.), or over the present 88 to 108 mc. band. In either band each FM station is permitted an overall maximum frequency swing of 150 kilocycles (kc.). The operating intermediate frequency (I. F.) may be chosen from a range of 4 to 20 mc. An I. F. value of 8.33 mc. is assumed to be a satisfactory compromise for all factors.

The FM wave energy is collected by an antenna, such as dipole 1, and fed to a tunable, or selective, radio frequency signal amplifier 2. The FM waves may be selected and amplified in cascaded amplifier stages, if desired. The selector circuits, of course, are designed to pass the entire frequency swing of the waves. Hence, they are each given a pass band width of about 200 kc. The selective converter 3 acts to reduce the center frequency of the amplified FM waves to a lower I. F. value without changing the frequency swing. The I. F. energy may be amplified in one or more amplifier stages, as indicated at 4. A suitable amplitude modulation limiter 5 is employed greatly to reduce any amplitude modulation effects which may have developed on the FM waves in their passage to the input terminals of the limiter. The limiter may be of any known type. Generally speaking, the limiter is a readily-saturatable amplifier which provides a substantially flat output above a predetermined signal input level. Both grid circuit and plate circuit limiting action may be employed in the limiter tube circuit.

The limited FM wave energy, with a mean frequency $F_c$ at the operating I. F. value, is applied to the FM detector circuit 6. Any well-known circuit having a suitable FM detection characteristic may be employed. As is well known, it is common practice to have a pass band width in excess of the 150 kc. swing at the detector input circuit. The FM detector acts to translate FM carrier wave energy into corresponding AM carrier wave energy, the latter being rectified to provide the modulation signals originally used to modulate the carrier at the FM transmitter station. The FM wave energy supplied to the detector 6 is a frequency-variable wave. That is, the frequency swings or deviations of the mean frequency $F_c$ correspond to amplitude of the modulation signals, while the modulation frequencies are represented by the rate of frequency deviation.

The concurrent discrimination and rectification occurs at detector 6 to provide solely the audio frequency modulation, if a predetermined signal to noise ratio exists at the input terminals of the limiter 5. When the ratio falls below a certain threshold value (hereinafter termed "improvement threshold") the audio frequency voltage output of audio frequency amplifier 26 is essentially noise voltage. The latter, when reproduced by the reproducer, is very disturbing to listeners. This noisy reception will usually occur during tuning between stations, and causes the familiar interstation rush of noise in an FM receiver. It will, also, occur as a result of deep fading since in this case the signal to noise ratio becomes very low. The "improvement threshold" point may be defined as the point of equality of the peak voltage of the noise and that of the incoming carrier. Reference is made to my paper "Frequency modulation noise characteristics," in the April 1937 issue of the Proceedings of the Institute of Radio Engineers, for a more complete analysis of the improvement threshold characteristics.

At the aforesaid point of equality there is a complete cancellation of the signal by the noise. This produces intervals of zero signal, which are characteristic of 100% amplitude modulation. The output energy of the limiter rather suddenly becomes amplitude modulated by the noises at the improvement threshold. Accordingly, any rectifier device will automatically provide a voltage representative of the amplitude modulation at the threshold point. In general, my invention contemplates utilizing the control voltage derived from the amplitude modulation, existing in the limiter input energy at the improvement threshold, for automatic silencing or muting of the receiver system. The control voltage is derived from the limiter signal input energy in the following manner.

The signal energy at the limiter input terminals is detected by any suitable form of rectification device. It is to be clearly understood that the rectifier, or detector, may be of any well known form constructed to detect amplitude modulated signals. By way of specific example I have shown a simple diode rectifier 7 whose anode 8 is connected to the high potential side of the resonant input circuit 9, it being understood that circuit 9 is tuned to the operating I. F. value of the receiving system. The low potential side of circuit 9 is connected to ground through a load resistor 10 which is shunted for high frequency currents by condenser 11. The signal energy is applied to the rectifier 7 by means of connections 12 terminating in a resonant circuit 13 coupled to the input circuit 9 of rectifier 7. It is to be understood that the input connections 12 may be made to any desired point between converter 3 and the limiter 5. My invention is not restricted to deriving signals for rectifier 7 from the precise input terminals of the limiter 5, but is generic in that it contemplates detection of the amplitude variations of the angle modulated carrier energy prior to amplitude limiting of the latter energy.

Since there is applied to the detector 7 I. F. signal energy transmitted through the resonant circuits 13 and 9, and since the cathode 14 of the rectifier 7 is returned to the grounded end of load resistor 10, there will be developed across the load resistor 10 a noise voltage of audio frequency which is representative of the noise pattern of the detected signals. As will be shown in further detail at a later point, the audio frequency noise voltage developed across load resistor 10 has a wave form which is dependent on the relative magnitudes of the carrier voltage and the noise voltage. The wave form will have a varying degree of symmetry or asymmetry dependent upon the relation between the magnitudes of the carrier and noise voltages.

In accordance with my invention, the audio frequency noise voltage developed across load resistor 10 is subjected to full wave rectification by an audio frequency rectifier system, and there is taken off from the full wave rectifier a differential voltage which will be a function of the intensity of the noise impulses existing on the collected FM signal energy. The audio frequency rectifier system may be of any suitable and well known form. In Fig. 1 I have shown a simple rectifier system consisting of a pair of diodes 15 and 16 whose cathodes are connected in common to the mid-point 17 of resistor 10 through a coupling condenser 18.

The anode 19 of diode 15 is coupled by the audio frequency coupling condenser 20 to the upper end of resistor 10, while the anode 21 of diode 16 is connected directly to the grounded end of resistor 10. The load resistor 22 is shunted directly across the electrodes of diode 15, while the load resistor 23 is shunted directly across the electrodes of diode 16. It will be noted that the lower end, or anode terminal, of resistor 23 is grounded, while the junction of resistors 22 and 23 is connected to the common cathode lead of the diodes 15 and 16. In this way, the audio voltage developed across each half of resistor 10 is applied to a respective one of the diode rectifiers 15 or 16.

There will, then, be developed across each of the respective load resistors 22 and 23 rectified voltage which is proportional to the magnitude of the audio noise envelope. Thus, rectifier 15 will rectify one half of the noise wave, while the rectifier 16 will rectify the opposite half of the noise wave. The lower end of resistor 23 is grounded. The lead 24, which is the noise squelch lead, has its input end connected to a suitable point on resistor 22. The input end of lead 24 may be made adjustable as in the form of a slider, and a resistor-condenser filter network 25 is included in circuit with lead 24 in order to remove all audio frequency variations.

The voltage transmitted over lead 24 corresponds to the differential, or phase-opposed, voltages developed across resistors 22 and 23. In other words, the negative voltage developed across resistor 22 is opposed by the positive voltage developed across resistor 23. The resultant difference voltage is utilized for providing a biasing voltage for the input grid 25' of the audio frequency amplifier tube 26. The grid 25' is connected to the slider 27 of a potentiometer 28 which is arranged in circuit with the audio frequency coupling condenser 29 in the high potential output lead of the FM detector network 6. The cathode of audio frequency amplified tube 26 is connected to ground through a suitable grid biasing resistor 30, while the plate of tube 26 includes in circuit therewith the primary winding of the audio output transformer 31. The remainder of the audio frequency amplifier circuit is well known, and need not be described in any further detail.

The grid 25' returns to the grounded end of biasing resistor 30 through a path which consists of slider 27, resistor 28, lead 24, resistor 22 and resistor 23. In other words, in the absence of noise voltage developed across the load resistor 10 of detector 7, effective bias for grid 25' is produced by resistor 30. However, upon the development of noise voltage across resistor 10 there will be produced at the selected point on resistor 22 a differential direct current voltage whose magnitude is proportional to the envelope of the noise voltage wave form across resistor 10.

The slider is adjusted on resistor 22 for a balance of the outputs from rectifiers 15 and 16 in the strong-signal condition. In other words, the slider of resistor 22 provides a balancing device. Normally the output of rectifier 16 would be reduced in some manner so that the variation of the slider would permit of matching the rectifier outputs. For example, the resistance value for resistor 23 could be lower than the resistance value of resistor 22. This matching adjustment takes care of any inequalities in tubes and other components, and would be made in the condition of symmetrical wave form which is the strong-signal condition.

Generally speaking, the muting network in Fig. 1 functions in the following manner. Rectifier 15 rectifies the positive excursions of the wave form (reference being made to the portion *b* of the curve in Fig. 2*d*). The rectification is a peak voltage rectification which produces negative voltage at the high potential, or plate, side of resistor 22. Hence, a peak voltage corresponding to amplitude *b* will appear across resistor 22 when the wave form shown in Fig. 2*d* is being rectified. Diode 16 rectifies the negative excursions of the wave so that a peak voltage equal to the wave section *c* of Fig. 2*d* will appear across resistor 23. The connections to diode 16 are reversed so that its rectified voltage is positive. The resulting voltage appearing across the series combination of resistors 22 and 23 is, therefore, the difference between the peak voltages *b* and *c*. It will be appreciated that the voltage appearing across resistor 10 is split into two portions which are rectified in a series-connected, full-wave rectifying system. The series-connection causes the detected outputs to cancel so long as the input wave is symmetrical.

In order to explain more clearly the functioning of the squelch rectifiers 15 and 16, reference is now made to Figs. 2*a* to 2*d* inclusive. In Fig. 2*a* I have shown a graph of the detector current. In that graph "detector current" is plotted as ordinates against "time" as abscissae. In the absence of noise, the current will have a constant value at amplitude *a*. When a noise impulse *x* appears, the noise and carrier voltages add and subtract so as to modulate the detector current above and below the constant value *a*. The detected output then has the wave form sown in Fig. 2*b*.

As long as the amplitude of the noise is less than the amplitude of the carrier, the noise impulse cannot cancel the detector current completely to the zero value. As soon as the noise becomes larger in amplitude than the carrier, the condition depicted in Fig. 2*c* appears. The graph in Fig. 2*c* is similar to that in Fig. 2*a*, except for the fact that the effect of the increasing noise is portrayed.

The condition during which the noise and carrier voltages are out of phase produces a complete cancellation of the detector current. The negative swings of the detector current are thus definitely limited by the zero value of current. The positive excursions of the detector current are not limited. The carrier and noise may add to produce relatively high values of positive excursions of the diode current (positive with respect to amplitude *a* in Fig. 2*c*). The wave form for this condition of the noise being stronger than the carrier is depicted in Fig. 2*d*. Here the negative peak clipping has made amplitude *c* less than amplitude *b*. Hence, a dissymmetry has been introduced which starts to become manifest at the point of equality of noise and carrier voltage.

As long as the noise voltage is symmetrical, as shown in Fig. 2*b*, the push-pull rectifiers 15 and 16 produce a balanced rectified output. However, when a dissymmetry as shown in Fig. 2*c* is applied to these diodes the higher positive excursions which are rectified by diode 15 produce a greater voltage across the resistor 22 than the lower negative excursions which are rectified by diode 16. The resulting voltage appearing across the series connection of resistors 22 and 23 is, therefore, more negative. Consequently, when the signal falls to values below the improvement threshold, the output of the rectifiers 15 and 16 is a negative voltage which is fed to the grid of amplifier 26. It is, again, emphasized that the output slider of resistor 22 is adjusted for a balance of the outputs from rectifiers 15 and 16 in the strong-signal condition.

It will be clear, therefore, that I have provided a method of muting the audio network of a receiver of angle modulated carrier waves, in which the difference between consecutive half cycles of the detected amplitude modulation component of the noise is utilized as a muting voltage. In accordance with my present invention, the audio amplifier tube 26 is biased to cut-off when the noise components on the received FM carrier are of such magnitude that the improvement threshold is not exceeded. However, as the noise components decrease with respect to the carrier level, the wave form of the audio frequency noise voltage across resistor 10 increasingly approaches symmetry, and, therefore, the grid 25 is automatically removed from cut-off.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a receiver of angle modulated carrier wave energy comprising a carrier wave amplifier, a frequency demodulator and a modulation frequency amplifier coupled in cascade; the improvement which includes a detector coupled to said carrier wave amplifier, said detector having an output load circuit for limiting only the peak carrier voltage of a predetermined polarity of amplitude modulated carrier energy appearing at the demodulator input in response to the angle modulated energy decreasing to a level such that peak carrier voltage is substantially equal to peak noise voltage, a pair of rectifiers, one of said rectifiers being coupled across one portion of said detector output load circuit so poled as to rectify said limited peak carrier voltage, the other of said rectifiers being coupled across another portion of said detector output load circuit so poled as to rectify the peak carrier voltages of the opposite polarity, said rectifiers having individual load impedance elements connected for adding the rectified voltages in opposition to derive a muting bias voltage, and a circuit coupled between said load impedance elements and the amplifier for impressing said muting bias voltage on the amplifier to suppress operation thereof.

2. In a frequency modulation receiver of the type having a tuning means, a frequency discriminator and an audio amplifier; the improvement which includes a detector having an output load element for limiting the peaks of a predetermined polarity of amplitude modulation appearing in the discriminator input energy in response to adjustment of said tuning means between stations, two rectifiers, one of said rectifiers being coupled across one portion of said detector output load element so poled as to rectify the limited peaks of the noise modulation voltage peaks, the other one of said rectifiers being coupled across another portion of said detector output load element so poled as to rectify the unlimited peaks of the noise modulation voltage peaks, said rectifiers having individual output load circuits connected for deriving the difference of the rectified voltages, and further means for muting said audio amplifier with the difference of said rectified voltages, thereby to prevent the rush of noise commonly produced during absence of carrier.

3. A receiver of angle modulated carrier energy including a frequency demodulator for demodulating the carrier energy, means utilizing the demodulated energy, a peak limiter for limiting only the peaks of a predetermined polarity of amplitude modulated carrier energy appearing in response to the received modulated carrier energy decreasing below a predetermined threshold, said peak limiter having an output load circuit for developing a voltage of assymmetrical wave form, a pair of rectifiers, one of said rectifiers being coupled across a portion of said limiter output load circuit so poled as to rectify a predetermined polarity of said assymmetrical wave form voltage, the other of said rectifiers being coupled across the remaining portion of said limiter output load circuit so poled as to rectify the opposite polarity of said assymmetrical wave form voltage, said rectifiers having individual load impedance elements connected to derive a control voltage representative of the difference of the rectified voltages, and means for preventing said utilization in response to said control voltage.

4. In a frequency modulation receiver wherein frequency modulated carrier waves are subject to noise components; the improvement which comprises a peak limiter having an output load circuit for limiting only the peaks of a predetermined polarity of amplitude modulated carrier energy appearing upon the received signal to noise ratio decreasing to a predetermined threshold to derive a voltage of variable assymmetry, and means for suppressing the utilizing of detected energy in response to a control voltage derived from the assymmetry of the derived voltage, thereby to prevent reproduction of noise, said means including a pair of rectifiers, one of said rectifiers being coupled across one portion of said limiter output load circuit so poled as to rectify the limited peaks of the carrier energy, the other of said rectifiers being coupled across another portion of said limiter output load circuit so poled as to rectify the unlimited peaks of the carrier energy, each of said rectifiers having a load impedance element, said elements being connected to derive said control voltage representative of the difference of the rectified voltages.

MURRAY G. CROSBY.

REFERENCES CITED

The following references are of record in the file of this patent:

UNITED STATES PATENTS

| Number | Name | Date |
|---|---|---|
| 2,063,295 | Braden | Dec. 8, 1936 |
| 2,070,354 | Brand | Feb. 9, 1937 |
| 2,261,643 | Brown | Nov. 4, 1941 |
| 2,296,101 | Foster | Sept. 15, 1942 |
| 2,370,216 | Worcester, Jr. | Feb. 27, 1945 |
| 2,404,626 | Fyler | July 23, 1946 |

OTHER REFERENCES

Impulse Noise in F-M Reception, by V. D. Landon, Electronics, February 1941, pages 26–30.